US00RE47192E

(19) United States
(12) Reissued Patent
Walker

(10) Patent Number: US RE47,192 E
(45) Date of Reissued Patent: Jan. 8, 2019

(54) LIFTGATE HAVING A SIDE-LOADABLE LOAD PLATFORM

(71) Applicant: ANTHONY LIFTGATES, INC., Pontiac, IL (US)

(72) Inventor: Thomas Walker, Pontiac, IL (US)

(73) Assignee: ANTHONY LIFTGATES, INC., Pontiac, IL (US)

(21) Appl. No.: 15/457,213

(22) Filed: Mar. 13, 2017

Related U.S. Patent Documents

Reissue of:
(64) Patent No.: 9,481,282
Issued: Nov. 1, 2016
Appl. No.: 14/076,744
Filed: Nov. 11, 2013

U.S. Applications:
(60) Provisional application No. 61/797,236, filed on Dec. 3, 2012.

(51) Int. Cl.
*B60P 1/43* (2006.01)
*B60P 1/44* (2006.01)

(52) U.S. Cl.
CPC ..... *B60P 1/435* (2013.01); *B60P 1/4421* (2013.01); *B60P 1/4435* (2013.01)

(58) Field of Classification Search
None
See application file for complete search history.

(56) References Cited

U.S. PATENT DOCUMENTS 2,530,341 A 11/1950 Satsky
3,172,501 A 3/1965 Ramer
3,521,775 A 7/1970 Vermette
3,795,329 A * 3/1974 Martin et al. ..... B60P 1/4421 187/244
3,831,788 A * 8/1974 Erlinder ..... 414/545
3,991,857 A 11/1976 Wolk et al.
4,007,844 A * 2/1977 Perkins ..... 414/471
4,063,619 A 12/1977 Drews
4,219,103 A 8/1980 Harsacky
4,479,753 A * 10/1984 Thorley ..... 414/541
4,563,121 A * 1/1986 Drews ..... 414/545
5,052,521 A 10/1991 Wendt et al.
5,263,808 A * 11/1993 Kent ..... 414/545
5,513,943 A * 5/1996 Lugash et al. ..... B60P 1/4421 187/244
5,769,593 A * 6/1998 Buffaloe ..... 414/537
8,740,539 B2 * 6/2014 Ablabutyan ..... 414/545
2003/0015885 A1 * 1/2003 Landwehr ..... B60P 1/435 296/61
2008/0143280 A1 * 6/2008 Rock ..... B60P 1/4471 318/16

(Continued)

FOREIGN PATENT DOCUMENTS

WO WO 92/07731 * 3/1992 ..... B60P 1/4421

*Primary Examiner* — Jeffrey L. Gellner
(74) *Attorney, Agent, or Firm* — Barnes & Thornburg LLP; Mark J. Nahnsen

(57) ABSTRACT

A liftgate for loading and unloading cargo from a vehicle. The liftgate includes a moveable load platform having a proximal deck section and a distal deck section pivotally coupled to the proximal deck section. A side ramp is pivotally coupled to the distal deck section to facilitate unobstructed side loading and unloading of the distal deck section of the load platform.

18 Claims, 12 Drawing Sheets

(AMENDED)

(56) References Cited

U.S. PATENT DOCUMENTS

| | | | | |
|---|---|---|---|---|
| 2009/0072570 | A1* | 3/2009 | Savoy | 296/56 |
| 2010/0038181 | A1 | 2/2010 | Jones | |
| 2012/0121369 | A1* | 5/2012 | Ablabutyan | B60P 1/4421 414/540 |
| 2013/0136567 | A1* | 5/2013 | Hambardzumyan | 414/540 |

* cited by examiner

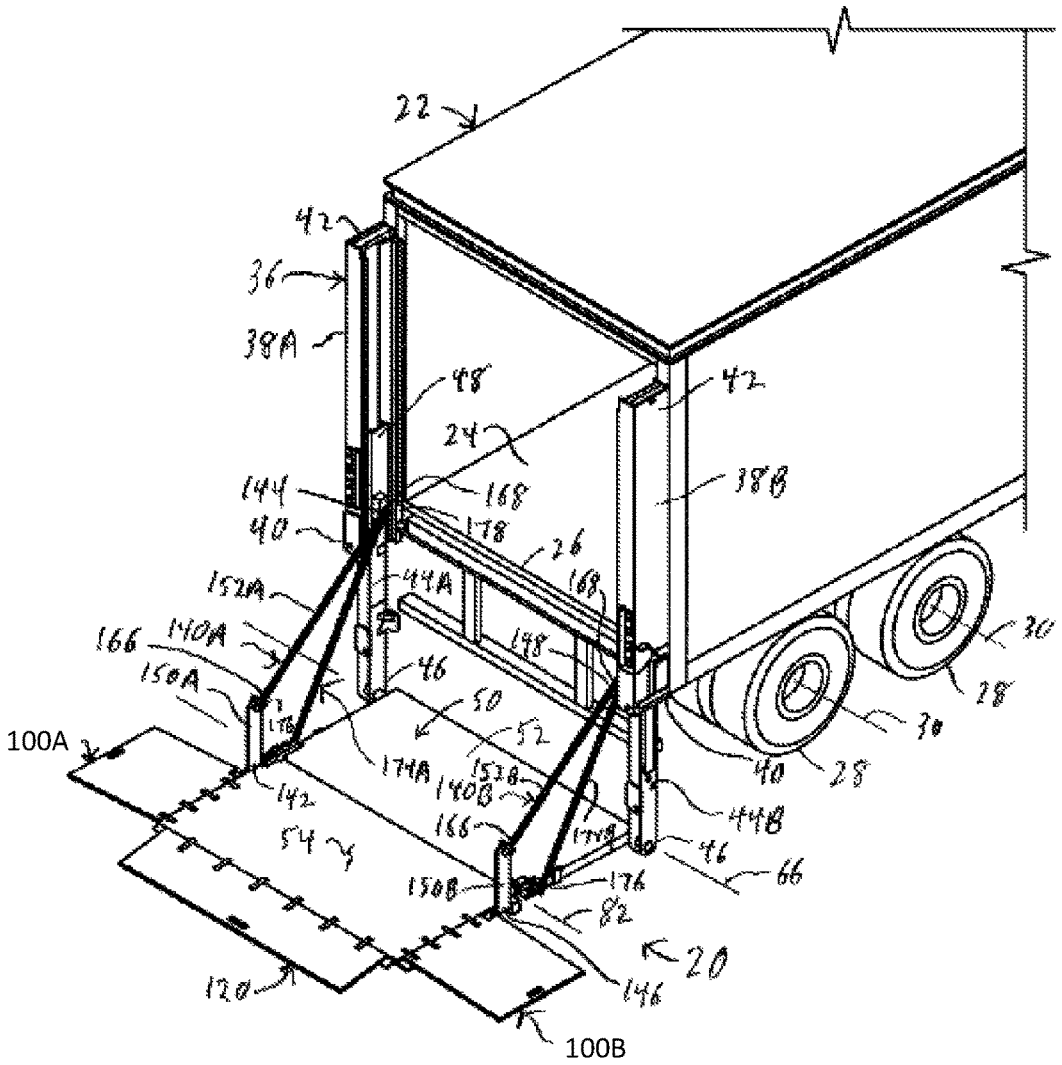
FIG. 1 (AMENDED)

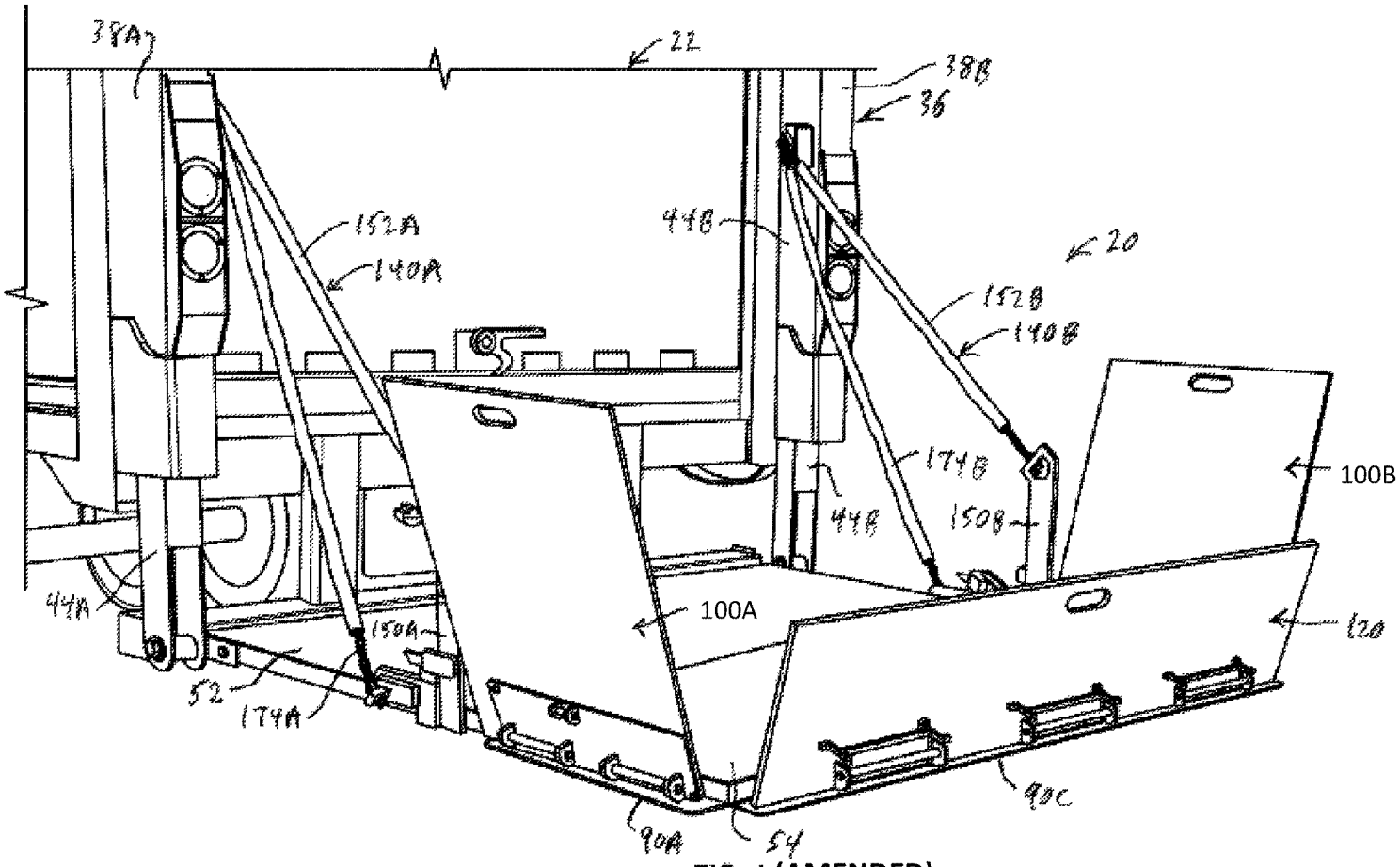
FIG. 4 (AMENDED)

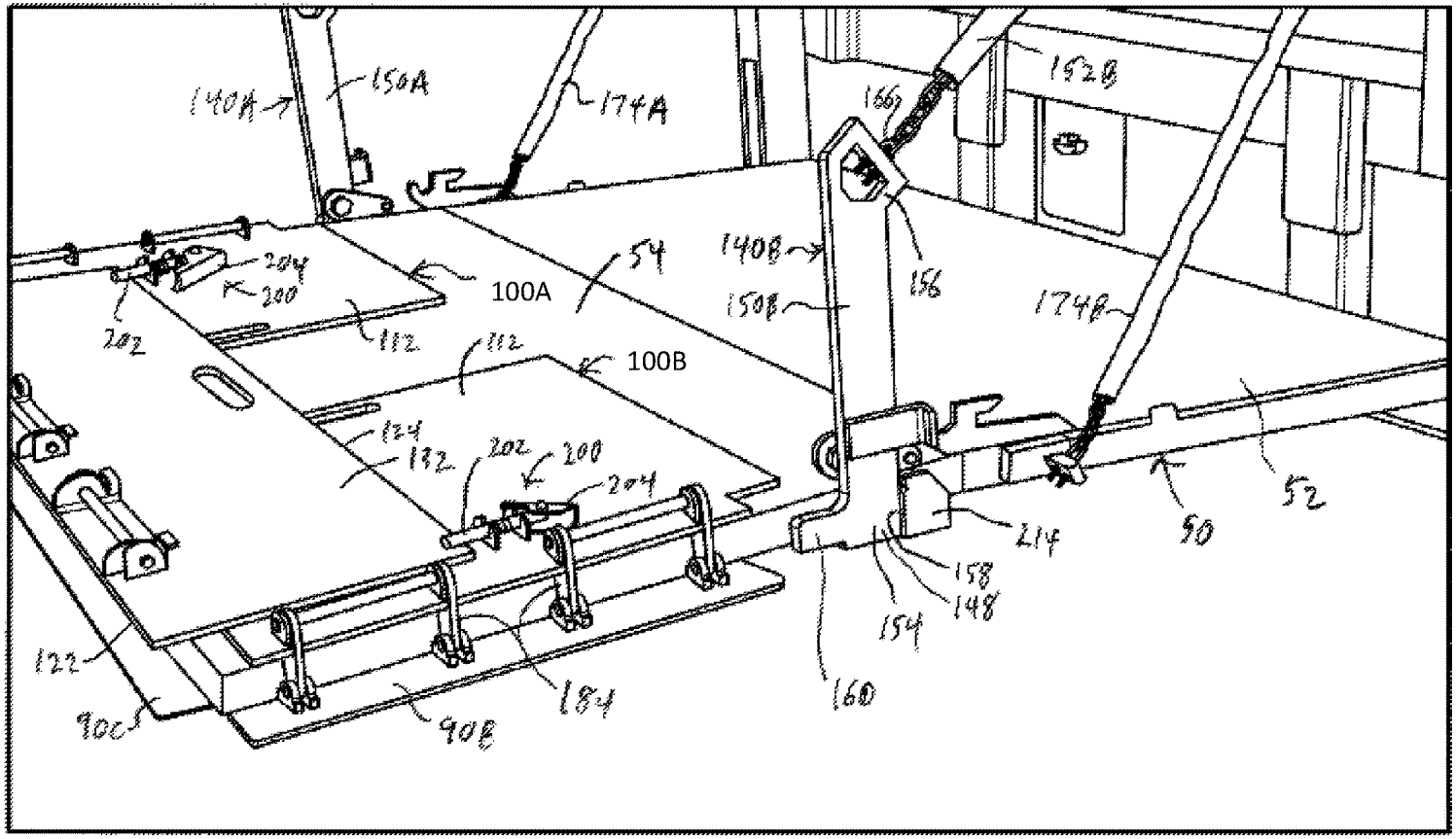
FIG. 5 (AMENDED)

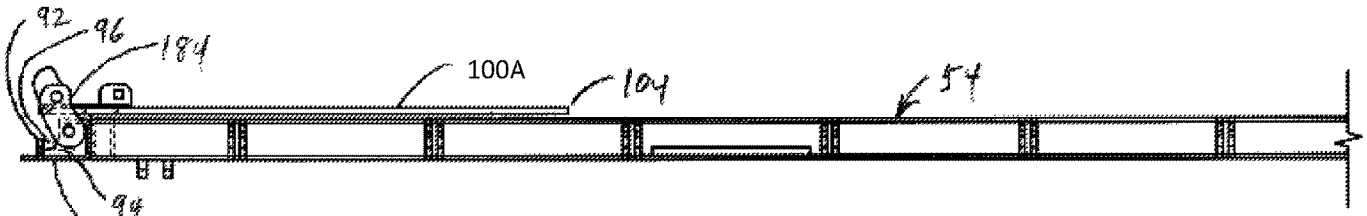
FIG. 8 (AMENDED)

LIFTGATE HAVING A SIDE-LOADABLE LOAD PLATFORM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present disclosure is directed to a liftgate having a load platform that is selectively moveable between a lowered position and a raised position, and a side ramp pivotally coupled to a side of the load platform such that cargo can be loaded onto or unloaded from the side of the load platform via the side ramp. In particular, the liftgate includes a restraint mechanism coupled to the load platform for supporting the load platform while not interfering with cargo movement between the load platform and the side ramp.

Liftgates are used in connection with vehicles such as trucks and trailers to facilitate the loading and unloading of cargo from the vehicle when the cargo needs to be moved vertically between a loading surface, such as a ground surface or a dock surface, and the surface of the vehicle cargo floor. The liftgate is typically mounted to the rear end of a truck or trailer to facilitate loading and unloading of the truck or trailer. Typically, cargo is moved on or off of the load platform over the distal end of the load platform in a direction parallel to the longitudinal axis of the vehicle and the load platform. This requires that the vehicle and the load surface be located in an end-to-end relationship. Often times, the vehicle must be positioned alongside the loading surface such that cargo cannot be directly moved between the load surface and the distal end of the load platform, such that side loading of the load platform in a direction transverse to the longitudinal axis of the load platform and vehicle is desirable.

SUMMARY

A liftgate for use in loading and unloading cargo from a vehicle. The liftgate comprises a lift mechanism and a moveable load platform having a proximal end coupled to the lift mechanism, a distal end spaced apart from the proximal end, a first side edge extending between the proximal end and the distal end of the load platform, and a second side edge extending between the proximal end and the distal end of the load platform. The load platform is selectively moveable between a lowered position and a raised position by the lift mechanism. A restraint is coupled to the first side edge of the load platform and is adapted to support the load platform. A side ramp is pivotally coupled to the first side edge of the load platform between the restraint and the distal end of the load platform. The side ramp is selectively pivotal with respect to the load platform between an operational position wherein the side ramp extends outwardly from the load platform and a stored position. When the side ramp is in the operational position, cargo can be moved along an unobstructed pathway between the side ramp and the load platform without interference by the restraint thereby enabling side loading and unloading of the load platform.

BRIEF DESCRIPTION OF THE DRAWING FIGURES

FIG. 1 is a partial perspective view of the liftgate of the present disclosure shown mounted to the rear end of a vehicle;

FIG. 4 is a perspective view of the liftgate shown with the first and second side ramps and the end ramp extending generally upwardly from the distal deck section of the load platform in their restraint positions;

FIG. 5 is a partial perspective view showing the proximal deck section and distal deck section of the load platform in their extended positions, and the first and second side ramps and the end ramp secured in their stored positions;

FIG. 8 is a partial cross sectional view taken along the transverse axis of the distal deck section of the load platform;

DETAILED DESCRIPTION

Figure 2:
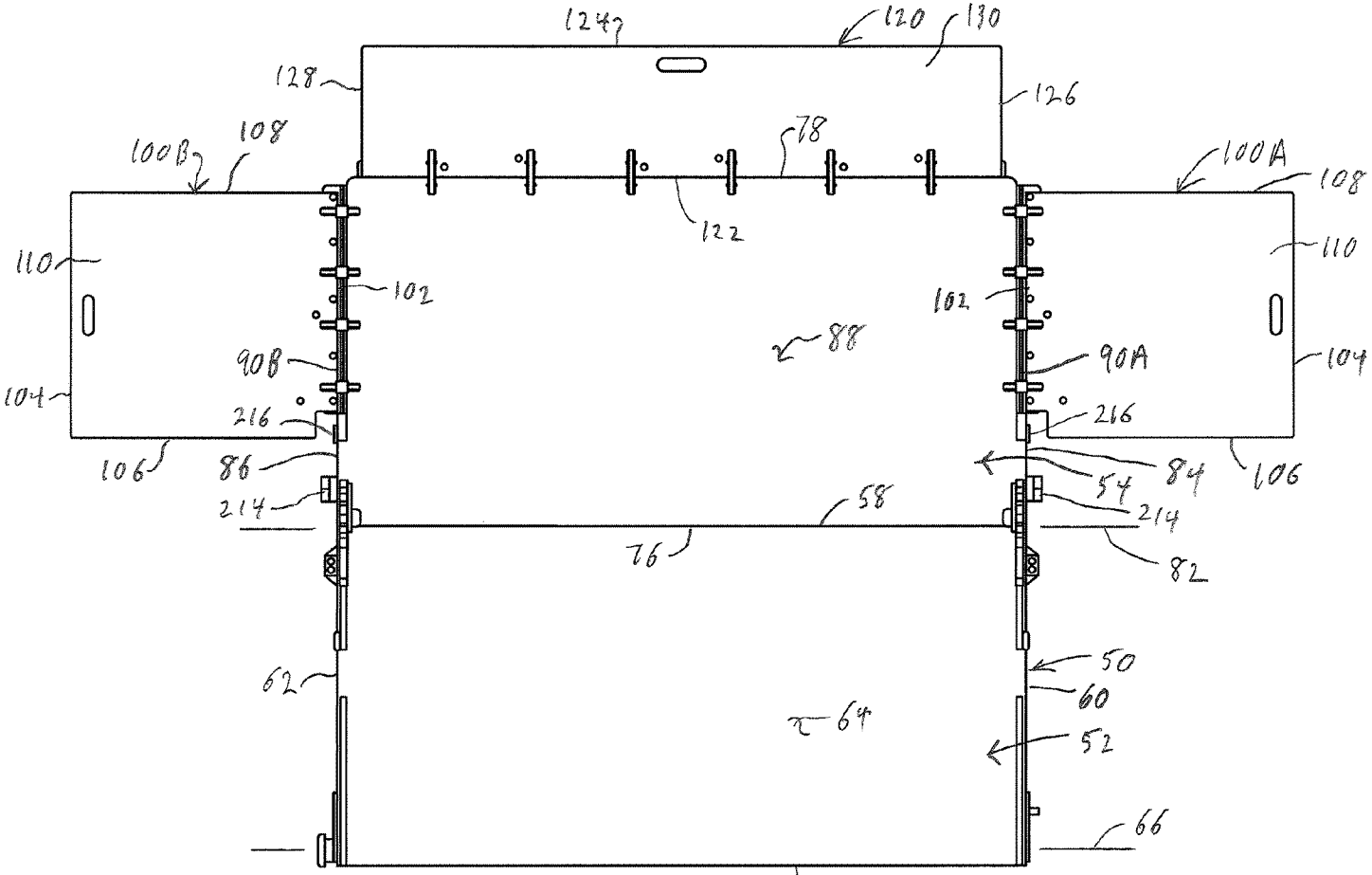
FIG. 2 is a top plan view of the proximal deck section and distal deck section of the load platform in their extended positions, and the first and second side ramps and the end ramp in their operational positions.

The present disclosure is directed to a liftgate for a vehicle having a load platform that is selectively moveable between a lowered position and a raised position and a side ramp coupled to a side of the load platform for side loading and unloading of cargo onto or from the load platform by way of the side ramp. An embodiment of the liftgate having a side-loadable load platform is shown in FIGS. 1-16 as liftgate 20. Liftgate 20 is adapted to be mounted to the aft end of a vehicle 22. Vehicle 22 may comprise a truck, trailer, or other cargo conveying apparatus. Vehicle 22 includes a generally planar and horizontal cargo floor 24 having a generally linear rear edge 26. Vehicle 22 may include wheels 28 rotatably mounted to vehicle 22 for rotation about one or more rotational axes 30. Rear edge 26 of cargo floor 24 and rotational axes 30 of wheels 28 are generally parallel to one another. Vehicle 22 includes a transverse axis that is generally parallel to rear edge 26 of cargo floor 24 and rotational axes 30 of wheels 28, and a longitudinal axis that extends from the aft end to the front end of vehicle 22 generally perpendicular to rear edge 26 of cargo floor 24 and rotational axes 30 of wheels 28. The surface of cargo floor 24 of vehicle 22 is typically located at a vertical height above a loading surface. The loading surface may comprise the surface of the ground, road, parking lot or the like on which wheels 28 of vehicle 22 are supported, or the surface of a loading dock, side walk or the like which may be located at a vertical height above the surface on which the wheels 28 are supported.

Liftgate 20 includes a lift mechanism 36. Lift mechanism 36 includes columns 38A and 38B that are adapted to be stationarily mounted to the aft end of vehicle 22 adjacent rear edge 26 of cargo floor 24. Each column 38A-B is generally linear and extends generally vertically between a bottom end 40 and a top end 42. Columns 38A-B are spaced apart from one another and are generally parallel to one another and are generally located at opposite ends of rear edge 26 of cargo floor 24. Lift mechanism 36 also includes lifting posts 44A and 44B. Lifting post 44A is operatively coupled to column 38A and lifting post 44B is operatively coupled to column 38B. Each lifting post 44A-B is generally linear and extends generally vertically between a bottom end 46 and a top end 48. Lifting post 44A is selectively vertically slideable with respect to column 38A between a raised position wherein bottom end 46 of lifting post 44A is adjacent bottom end 40 of column 38A and a lowered position wherein bottom end 46 of lifting post 44A is located adjacent the surface that supports wheels 28 and spaced apart from bottom end 40 of column 38A. Lifting post 44B is similarly selectively vertically moveable with respect to column 38B between a lowered position and a raised position. Lifting posts 44A-B are conjointly moveable between their raised position and lower position by a drive mechanism, such that lifting posts 44A-B move vertically upwardly and downwardly in unison with one another.

Lift mechanism 36 includes a selectively moveable and foldable load platform 50. Load platform 50 includes a proximal deck section 52 and a distal deck section 54. Proximal deck section 52 is generally rectangular and includes a generally linear proximal edge 56 and a spaced apart and generally parallel and linear distal edge 58. Proximal edge 56 and distal edge 58 extend generally parallel to rear edge 26 of cargo floor 24 and rotational axes 30 of wheels 28. Proximal deck section 52 also includes a generally linear first side edge 60 and a spaced apart and generally parallel and linear second side edge 62. First side edge 60 and second side edge 62 extend between and generally perpendicular to proximal edge 56 and distal edge 58. Proximal deck section 52 includes a generally planar floor 64 mounted on a base. Floor 64 may comprise a plate, such as checkered plate. Proximal edge 56 of proximal deck section 52 is pivotally coupled to bottom ends 46 of lifting posts 44A-B for pivotal movement about a pivot axis 66. Proximal deck section 52 extends between bottom ends 46 of lifting post 44A and 44B with bottom end 46 of lifting post 44A being located adjacent first side edge 60 of proximal deck section 52 and bottom end 46 of lifting post 44B being located adjacent second side edge 62 of proximal deck section 52. Pivot axis 66 is generally parallel to rear edge 26 of cargo floor 24 and rotational axes 30 of wheels 28 of vehicle 22.

Distal deck section 54 is generally rectangular and includes a generally linear proximal edge 76 and a spaced apart and generally parallel and linear distal edge 78. Proximal edge 76 and distal edge 78 are generally parallel to one another and to proximal edge 56 and distal edge 58 of proximal deck section 52. Proximal edge 76 of proximal deck section 52 includes a plurality of hinge members 80 that are pivotally coupled to similar hinge members on distal edge 58 of proximal deck section 52. Proximal edge 76 of distal deck section 54 is pivotally coupled to distal edge 58 of proximal deck section 52 for pivotal movement about a pivot axis 82. Proximal deck section 52 and distal deck section 54 are pivotal with respect to one another about pivot axis 82. Pivot axis 82 is generally parallel to pivot axis 66.

Distal deck section 54 also includes a generally linear first side edge 84 and a spaced apart and generally parallel and linear second side edge 86. First side edge 84 and second side edge 86 extend generally perpendicularly between proximal edge 76 and distal edge 78. First side edge 84 of distal deck section 54 is located generally colinear with first side edge 60 of proximal deck section 52 when proximal deck section 52 and distal deck section 54 are in their generally horizontal extended positions. Second side edge 86 of distal deck section 54 is located generally colinear with second side edge 62 of proximal deck section 52 when proximal deck section 52 and distal deck section 54 are in their generally horizontal extended positions. Distal deck section 54 includes a generally planar floor 88 mounted on a base. Floor 88 may be formed from a plate, such as checkered plate.

Distal deck section 54 includes generally plate-like ledges 90A-C that extend outwardly from the bottom of the base of distal deck section 54 and generally parallel to and below the floor 88 to an outer edge. Ledge 90A extends along and outwardly from first side edge 84 of distal deck section 54, ledge 90B extends along and outwardly from second side edge 86 of distal deck section 54, and ledge 90C extends along and outwardly from distal edge 78 of distal deck section 54. One or more inner abutment members 92 are attached to and extend along an upper surface of each ledge 90A-C. One or more outer abutment members 94 are attached to and extend along an upper surface of each ledge 90A-C. Each outer abutment member 94 is spaced outwardly from an inner abutment member 92 such that a channel 96 is formed between each inner abutment member 92 and its associated outer abutment member 94.

Liftgate 20 includes side ramps 100A and 100B pivotally coupled to opposite sides of distal deck section 54. If desired, liftgate 20 may include only one side ramp 100A or 100B as desired. Each side ramp 100A-B includes a generally linear inner edge 102 and a spaced apart and generally parallel and linear outer edge 104. Inner edge 102 of side ramp 100A is located adjacent and generally parallel to first side edge 84 of distal deck section 54 and is pivotally coupled to first side edge 84. Inner edge 102 of side ramp 100B is located adjacent and generally parallel to second side edge 86 of distal deck section 54 and is pivotally coupled to second side edge 86.

Each side ramp 100A and 100B also includes a generally linear first side edge 106 and a spaced apart and generally parallel and linear second side edge 108. First side edge 106 and second side edge 108 extend generally perpendicularly between inner edge 102 and outer edge 104. Each side ramp 100A and 100B is generally rectangular and plate-like and includes a generally planar top surface 110 and a generally planar bottom surface 112. Each side ramp 100A and B may be formed from a plate, such as checkered plate. Side ramps 100A and 100B are respectively located on opposite sides of distal deck section 54. First side edges 106 of side ramps 100A and B are generally parallel to proximal edge 76 of distal deck section 54 and are spaced apart from proximal edge 76. Second side edges 108 of side ramps 100A and B are located generally parallel to and adjacent distal edge 78 of distal deck section 54.

Liftgate 20 includes an end ramp 120 that is pivotally coupled to distal edge 78 of distal deck section 54. End ramp 120 is generally rectangular and plate-like. End ramp 120 includes a generally linear inner edge 122 and spaced apart and generally parallel and linear outer edge 124. Inner edge 122 and outer edge 124 are generally parallel to proximal edges 56 and 76 and distal edges 58 and 78 of proximal and distal deck sections 52 and 54. End ramp 120 also includes a generally linear first side edge 126 and spaced apart and generally parallel and linear second side edge 128. First and second side edges 126 and 128 extend generally perpendicularly between inner edge 122 and outer edge 124. End ramp 120 extends substantially the width of distal deck section 54 between first side edge 84 and second side edge 86 of distal deck section 54. End ramp 120 includes a generally planar top surface 130 and a generally planar bottom surface 132. End ramp 120 may be formed as a plate, such as checkered plate.

Proximal edge 56 of proximal deck section 52 comprises a proximal edge of load platform 50, distal edge 78 of distal deck section 54 comprises a distal edge of load platform 50, first side edge 60 and first side edge 84 of proximal and distal deck sections 52 and 54 comprise a first side edge of load platform 50, and second side edge 62 and second side edge 86 of proximal and distal deck sections 52 and 54 comprise a second side edge of load platform 50.

Liftgate 20 includes restraints 140A and 140B. Restraint 140A includes a first end 142 coupled to first side edge 84 of distal deck section 54 and a second end 144 coupled to lifting post 44A. Restraint 140B includes a first end 146 coupled to second side edge 86 of distal deck section 54 and a second end 148 coupled to lifting post 44B. Restraint 140A includes a stanchion 150A and a tether 152A. Restraint 140B includes a stanchion 150B and a tether 152B. Stanchions 150A-B are constructed substantially identical to one another, although as a mirror image of one another. Tethers 152A-B are constructed substantially identical to one another.

Each stanchion 150A-B includes a generally elongate leg that extends generally linearly between a bottom end 154 and a top end 156. Bottom end 154 of each stanchion 150A-B includes a heel 158 and a toe 160 that extends outwardly in an opposite direction from heel 158. Toe 160 includes an engagement member such as a shelf 162. Each stanchion 150A-B may comprise a post or a generally plate-like member. Stanchions 150A-B are generally rigid.

Bottom end 154 of stanchion 150A is pivotally coupled to first side edge 84 of distal deck section 54 adjacent the proximal end of first side edge 84 and adjacent proximal edge 76 of distal deck section 54, and is spaced substantially apart from the distal end of first side edge 84 and apart from distal edge 78 of distal deck section 54. Bottom end 154 of stanchion 150B is pivotally coupled to second side edge 86 of distal deck section 54 and is located adjacent the proximal end of second side edge 86 and adjacent proximal edge 76 of distal deck section 54, and is spaced substantially apart from the distal end of second side edge 86 and apart from distal edge 78 of distal deck section 54. Stanchions 150A and B are both pivotal with respect to distal deck section 54 about a common generally linear pivot axis 164 that is generally parallel to pivot axes 66 and 82.

Each tether 152A-B includes a first end 166 and a second end 168. First end 166 of tether 152A is coupled to top end 156 of stanchion 150A and second end 168 of tether 152A is coupled to lifting post 44A. First end 166 of tether 152B is coupled to top end 156 of stanchion 150B and second end 168 of tether 152B is coupled to lifting post 44B. Each tether 152A-B may comprise a flexible, foldable or collapsible member, such as a chain, cable, rope, scissors links or the like. Each tether 152A-B is substantially non-elastic under tension, but is collapsible or foldable under compression. Each tether 152A-B may be enclosed within a flexible protective sleeve if desired.

Liftgate 20 also includes support members 174A and 174B. Each support member 174A-B extends between a first end 176 and a second end 178. First end 176 of support member 174A is coupled to a distal end of first side edge 60 of proximal deck section 52 and second end 178 of support member 174A is coupled to lifting post 44A. First end 176 of support member 174B is coupled to the distal end of second side edge 62 of proximal deck section 52 and second end 178 of support member 174B is coupled to lifting post 44B. Each support member 174A-B comprises a tether that may be constructed in the same manner as tethers 152A-B. Support members 174A-B may comprise a flexible, foldable or collapsible member such as a chain, cable, rope, scissors links or the like. Support members 174A-B are substantially non-elastic under tension, but are collapsible or foldable under compression. If desired support members 174A and B may be located within a flexible protective sleeve.

Figure 3:
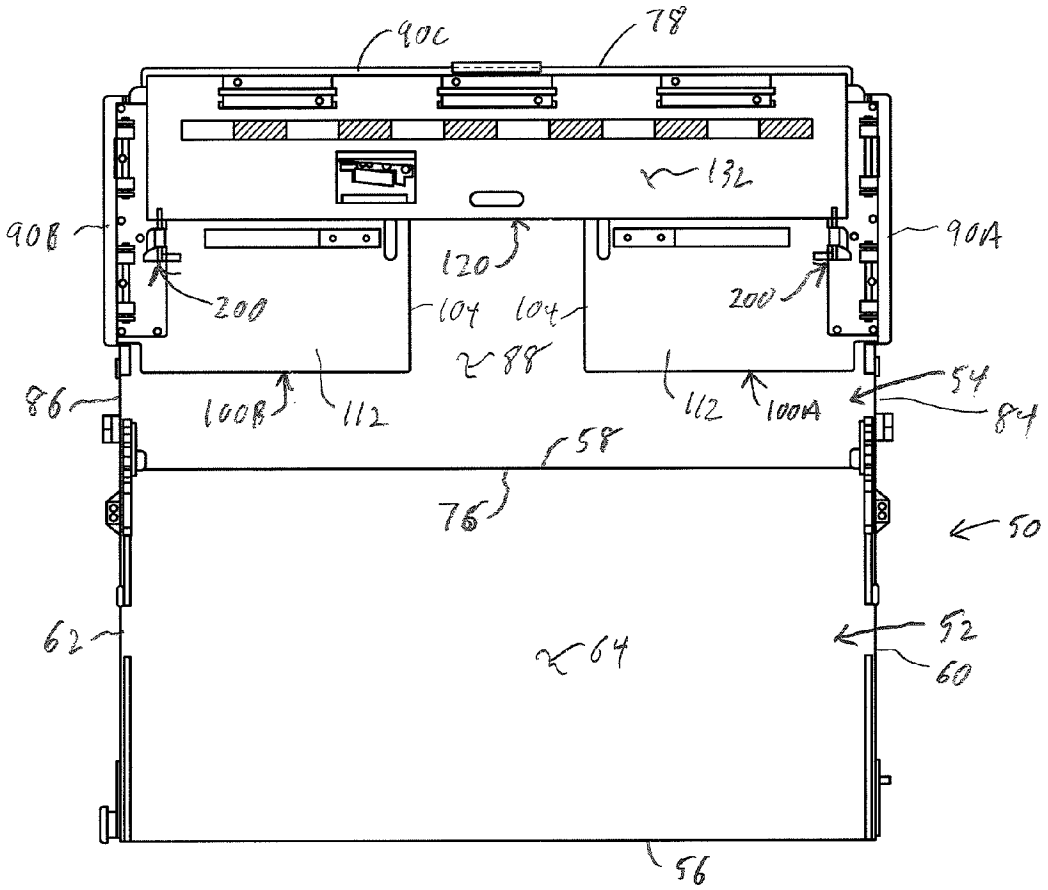
FIG. 3 is a top plan view showing the proximal deck section and the distal deck section of the load platform in their extended positions, and the first and second side ramps and the end ramp in their stored positions.

Side ramps 100A-B and end ramp 120 are each respectively pivotally connected to distal deck section 54 by one or more hinges such as links 184. Each link 184 is generally elongate and extends between a first end 186 and a second end 188. First end 186 of each link 184 is pivotally coupled to distal deck section 54 for pivotal movement about an inner pivot axis 190 with respect to distal deck section 54. Second end 188 of each link 184 is pivotally coupled to an inner edge of an associated side ramp 100A, side ramp 100B or end ramp 120, such that the associated side ramp 100A, side ramp 100B or end ramp 120 is pivotal with respect to link 184 about an outer pivot axis 192 that is generally parallel to inner pivot axis 190. Each ramp 100A-B and 120 is thereby selectively pivotal with respect to distal deck section 54 between an operational position wherein ramp 100A-B or 120 extends outwardly from distal deck section 54 such that the outer edge of the ramp is adapted to engage the loading surface, such as shown in FIG. 2, and a stored position as shown in FIG. 3 wherein the ramp 100A, 100B or 120 overlies floor 64 of distal deck section 54 and does not extend outwardly beyond the edges of distal deck section 54. When ramps 100A, 100B and 120 are pivoted to their stored positions, side ramps 100A and 100B are initially folded to their stored positions to overly floor 64 of distal deck section 54 and then end ramp 120 is pivoted to its stored position such that end ramp 120 overlies side ramps 100A and 100B and floor 64 of distal deck section 54.

Figure 13A:
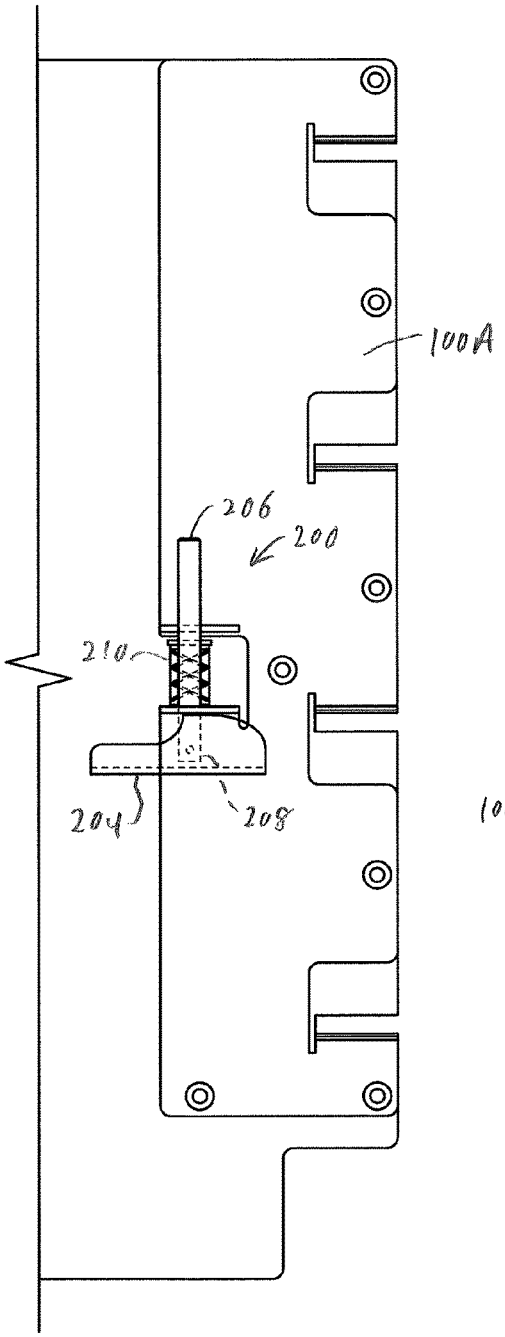
FIG. 13A is a top plan view of a side ramp showing the ramp latch in the extended position.
Figure 13B:
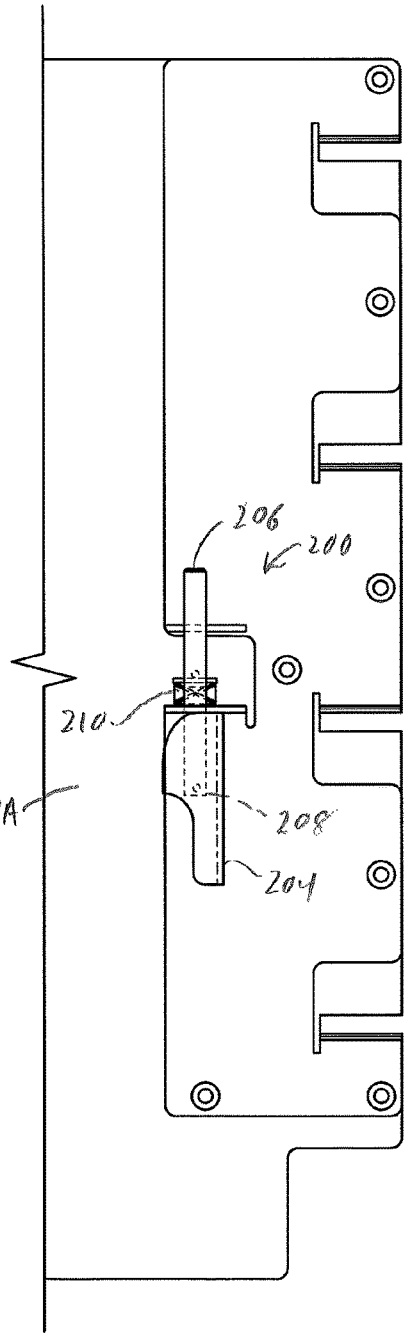
FIG. 13B is a top plan view of a side ramp showing the ramp latch in the retracted position.
Figure 14A:
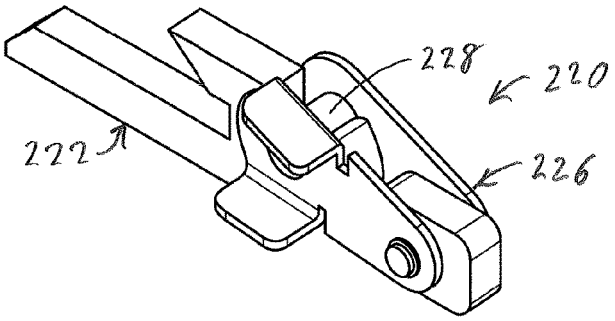
FIG. 14A is a perspective view of the locking mechanism for the load platform shown in the locked position.
Figure 14B:
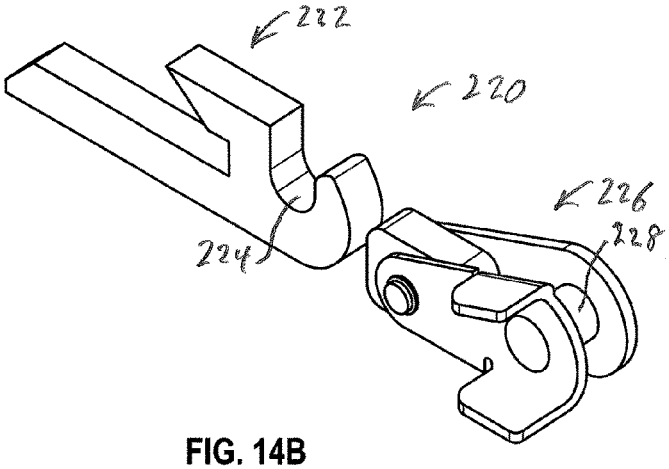
FIG. 14B is a perspective view of the locking mechanism for the load platform shown in the unlocked position.
Figure 15:
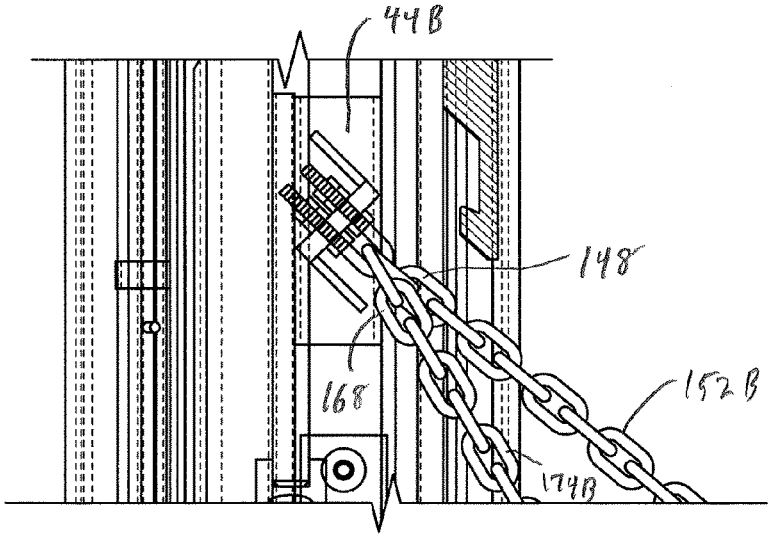
FIG. 15 is a partial side elevational view of the lift mechanism showing the end of the restraint and the end of the support member coupled thereto.
Figure 17:
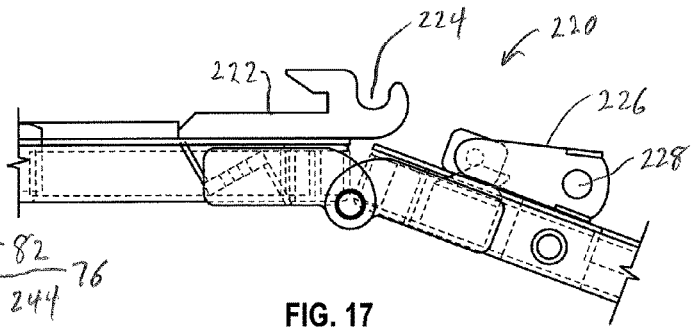
FIG. 17 is partial side elevational view showing the pivotal connection between the proximal deck section and the distal section of the load platform with the proximal deck section and distal deck section shown at an inclined angle with respect to one another and showing the locking mechanism in the unlocked position.

A ramp latch 200 is coupled to bottom surface 112 of each of side ramps 100A and 100B as shown in FIGS. 5 and 13A-B. Each ramp latch 200 includes a retaining member 202 and a pivotal lever 204 coupled to retaining member 202. Retaining member 202 includes a first end 106 and a second end 208 pivotally coupled to lever 204. Ramp latch 200 is selectively moveable between a locked position as shown in FIG. 13A and an unlocked position as shown in FIG. 13B. A resilient biasing member 210, such as a spring, resiliently biases retaining member 202 of ramp latch 200 toward the locked position. When ramps 100A, 100B and 120 are located in their stored positions as shown in FIG. 5, retaining members 202 of ramp latches 200 are adapted to overly a portion of end ramp 120 when ramp latches 200 are in their locked position such that retaining members 202 retain end ramp 120 in the stored position. End ramp 120 in turn retains side ramps 100A and 100B in their stored positions. Ramp latches 200 are moved to the unlocked position by manually pivoting lever 204 to retract retaining member 202 and compress biasing member 210, such that lever 204 releasably retains retaining member 202 in the retracted and unlocked position and such that retaining member 202 no longer overlies end ramp 120. End ramp 120, and then side ramps 100A-B, can then be selectively pivoted from their stored position towards their operational position.

Figure 11:
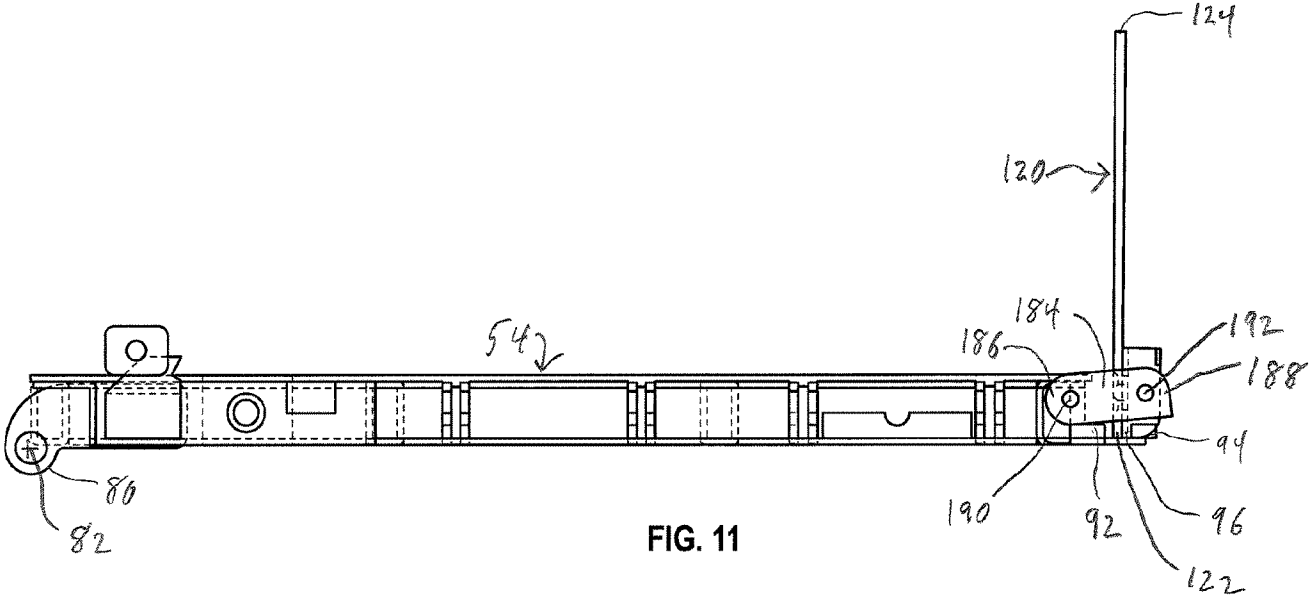
FIG. 11 is a side elevational view of the distal deck section of the load platform showing the end ramp in the upright retention position.
Figure 12:
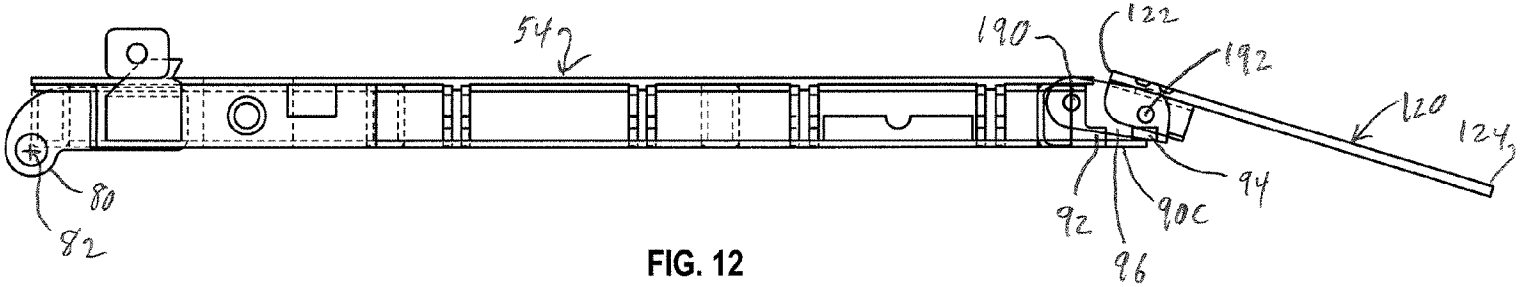
FIG. 12 is a side elevational view of the distal deck section of the load platform showing the end ramp in the outwardly extending operational position.

As shown in FIG. 4, each of the ramps 100A, 100B and 120 may be pivoted with respect to distal deck section 54 to a generally upright retaining position that is between the operational position and the stored position of each ramp. When ramps 100A-B and 120 are in the retaining position as shown in FIG. 4, each ramp is adapted to prevent cargo from falling off of distal deck section 54 and to retain cargo on distal deck section 54. As shown in FIGS. 11 and 12, end ramp 120 is pivoted about outer pivot axis 192 to a generally vertical and upright position and is raised vertically about inner pivot axis 190 such that inner edge 122 of end ramp 120 is located above channel 96 on ledge 90C. Inner edge 122 of end ramp 120 is then lowered into channel 96 such that inner edge 122 of end ramp 120 rests in engagement with ledge 90C between inner abutment member 92 and outer abutment member 94. When ramp 120 is in the retention position as shown in FIG. 11, inner edge 122 of end ramp 120 will engage either inner abutment member 92 or outer abutment member 94 when end ramp 120 is attempted to be pivoted in one direction or the other about outer pivot axis 192 such that, while some limited pivotal movement of end ramp 120 may be permitted about outer pivot axis 192, end ramp 120 will be retained in the generally upright retention position.

When it is desired to move the end ramp 120 to either the operational position as shown in FIG. 12 or the stored position as shown in FIG. 3 from its retention position, end ramp 120 is lifted vertically upwardly such that inner edge 122 is removed from channel 96 whereupon end ramp 120 may be pivoted about outer pivot axis 192 to either the operational position or stored position as desired. Side ramps 100A and 100B are selectively positioned in the generally upright retention position as described in connection with end ramp 120, wherein inner edge 102 of side ramps 100A and B are selectively inserted or removed from a channel 96 between inner abutment members 92 and outer abutment members 94 of ledges 90A-B. Each ramp 100A, 100B and 120 can be selectively positioned in its operational position, stored position or retention position independently of the other ramps.

Figure 16:
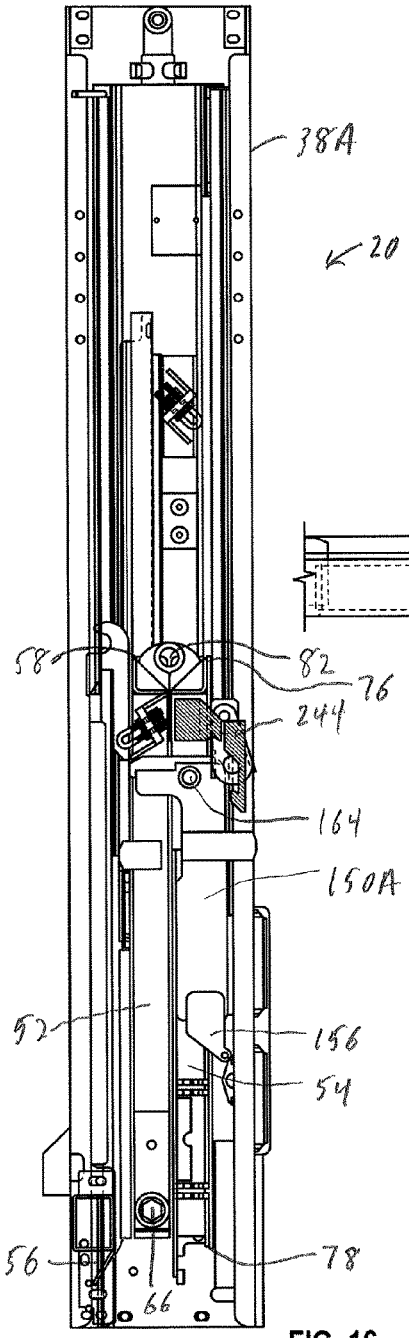
FIG. 16 is a side elevational view of the liftgate with the proximal deck section and the distal deck section of the load platform shown in the folded and retracted position.

Load platform 50 is selectively moveable by lift mechanism 36 between a lowered position as shown in FIG. 1 wherein load platform 50 is located at a height below the height of cargo floor 24 of vehicle 22 and a raised position wherein the top surface of load platform 50 is located generally coplanar with the top surface of cargo floor 24 of vehicle 22 for movement of cargo between load platform 50 and cargo floor 24. Load platform 50 is also selectively moveable or foldable between an extended position as shown in FIGS. 1 and 7 and a retracted position as shown in FIG. 16.

Figure 7:
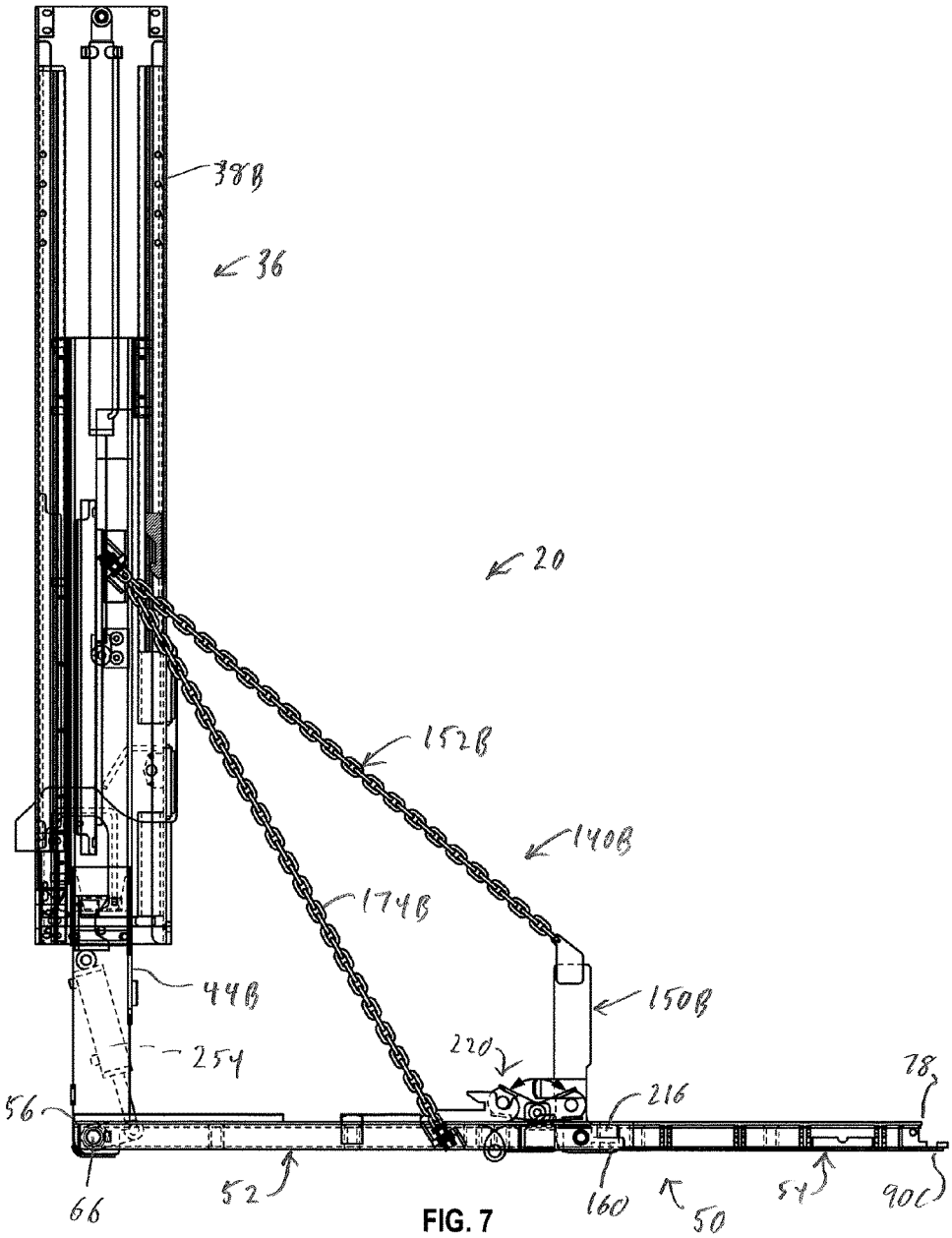
FIG. 7 is a side view of the liftgate shown with the proximal deck section and distal deck section of the load platform in their extended positions, with the first and second side ramps and end ramp removed for purposes of illustration.
Figure 10:
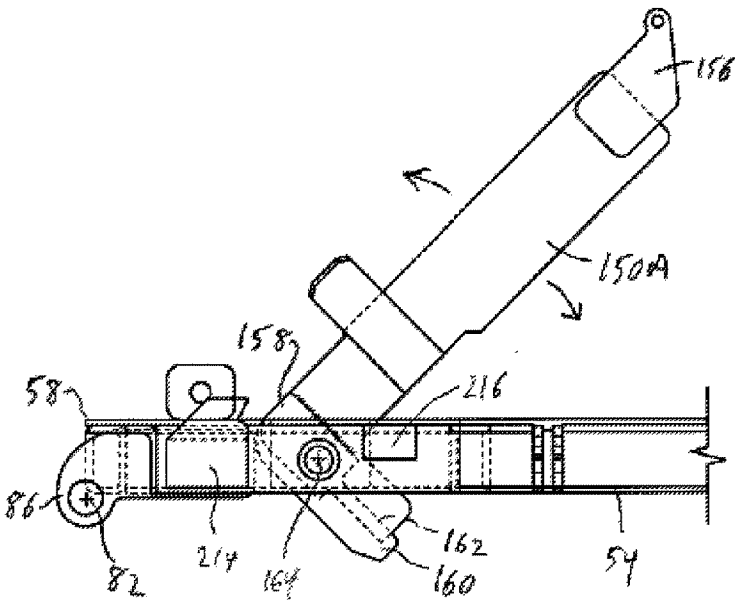
FIG. 10 is a partial side elevational view showing the stanchion of the restraint pivotally coupled to the distal deck section of the load platform adjacent the proximal end of the distal deck section.
Figure 9:
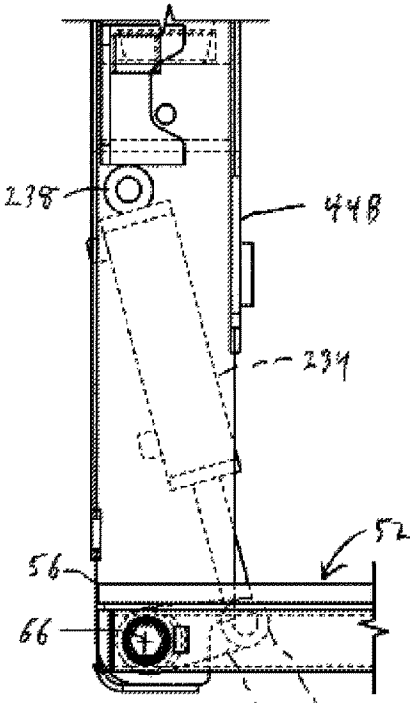
FIG. 9 is partial side elevational view showing the actuator coupled to the lift mechanism and to the proximal deck section of the load platform.

When load platform 50 is in the extended position as shown in FIGS. 1 and 7, proximal deck section 52 and distal deck section 54 are located in extended positions and are located generally coplanar with one another such that the surfaces of floors 64 and 88 are generally horizontal and coplanar with one another. When load platform 50 is in the extended position, proximal edge 56 of proximal deck section 52 is vertically supported by lifting posts 44A and B and distal edge 58 of proximal deck section 52 is vertically supported by support members 174A and B. When load platform 50 is in the extended position, distal deck section 54 is vertically supported by its pivotal connection to proximal deck section 52 and by restraints 140A and B. Restraints 140A and B support distal deck section 54 and prevent pivotal movement of distal deck section 54 with respect to proximal deck section 52 about pivot axis 82 in a direction such that distal deck section 54 would pivot downwardly toward the loading surface.

When load platform 50 is in the extended position, stanchions 150A and B of restraints 140A and B are in a generally upright position generally perpendicular to floor 88 of distal deck section 54, wherein heel 158 of each stanchion 150A and B engages a respective rear lug 214. Rear lugs 214 are respectively coupled to and extend outwardly from first side edge 84 and second side edge 86 of distal deck section 54. Shelf 162 of toe 160 of each stanchion 150A and B also engages a respective forward lug 216. Forward lugs 216 are respectively connected to and extend outwardly from first side edge 84 and second side edge 86 of distal deck section 54. Each stanchion 150A and B is pivotal about axis 164 between an operational position wherein each stanchion 150A-B is substantially upright and perpendicular to distal deck section 54 and a stored position wherein each stanchion 150A-B is substantially parallel to distal deck section 54. Each rear lug 214 and forward lug 216 respectively engages a stanchion 150A or B when stanchions 150A-B are in the upright operational position and prevent pivotal movement of stanchions 150A and B about axis 164 beyond the upright operational position in a direction away from the stored position.

Liftgate 20 also includes one or more locking mechanisms 220 coupled to load platform 50. Locking mechanism 220 includes a receiver 222 coupled to proximal deck section 52 adjacent proximal edge 56. Receiver 222 includes a receptacle 224 having an open top end. Locking mechanism 220 also includes a coupler 226 having a pin 228. Coupler 226 is pivotally coupled to distal deck section 54 adjacent proximal edge 76. When load platform 50 is in the extended position, coupler 226 is adapted to be pivoted to a locked position wherein pin 228 is located within receptacle 224 of receiver 222 whereby locking mechanism 220 prevents downward pivotal movement of distal deck section 54 about pivot axis 82 with respect to proximal deck section 52. Coupler 226 may be selectively pivoted to an unlocked position wherein pin 228 is removed from receptacle 224 wherein locking mechanism 220 does not prevent pivotal movement of distal deck section 54 with respect to proximal deck section 52 about pivot axis 82.

Liftgate 20 also includes an actuator 234 having a first end 236 and a second end 238. Actuator 234 may comprise a hydraulic cylinder having a housing and an extendable and retractable ram. First end 236 of actuator 234 is coupled to proximal edge 56 of proximal deck section 52 by a link 240. Second end 238 of actuator 234 is coupled to lifting post 44B. Actuator 234 is adapted to selectively pivot load platform 50 between the extended position of load platform 50 and the retracted or folded position of load platform 50.

When load platform 50 is in the extended position, and ramps 100A, 100B and 120 are in their stored positions, actuator 234 is adapted to pivot proximal deck section 52 about pivot axis 66 from a generally horizontal extended position to a generally vertical retracted position. As distal edge 58 of proximal deck section 52 pivots upwardly about pivot axis 66, distal edge 78 of distal deck section 54 pivots downwardly with respect to proximal deck section 52 about pivot axis 82 such that distal deck section 54 pivotally moves from a generally horizontal extended position toward a generally vertical retracted position. As proximal deck section 52 and distal deck section 54 pivot from their horizontal extended positions toward their folded vertical retracted positions, support members 174A and B are relieved of their tensile support loads and collapse.

Figure 6:
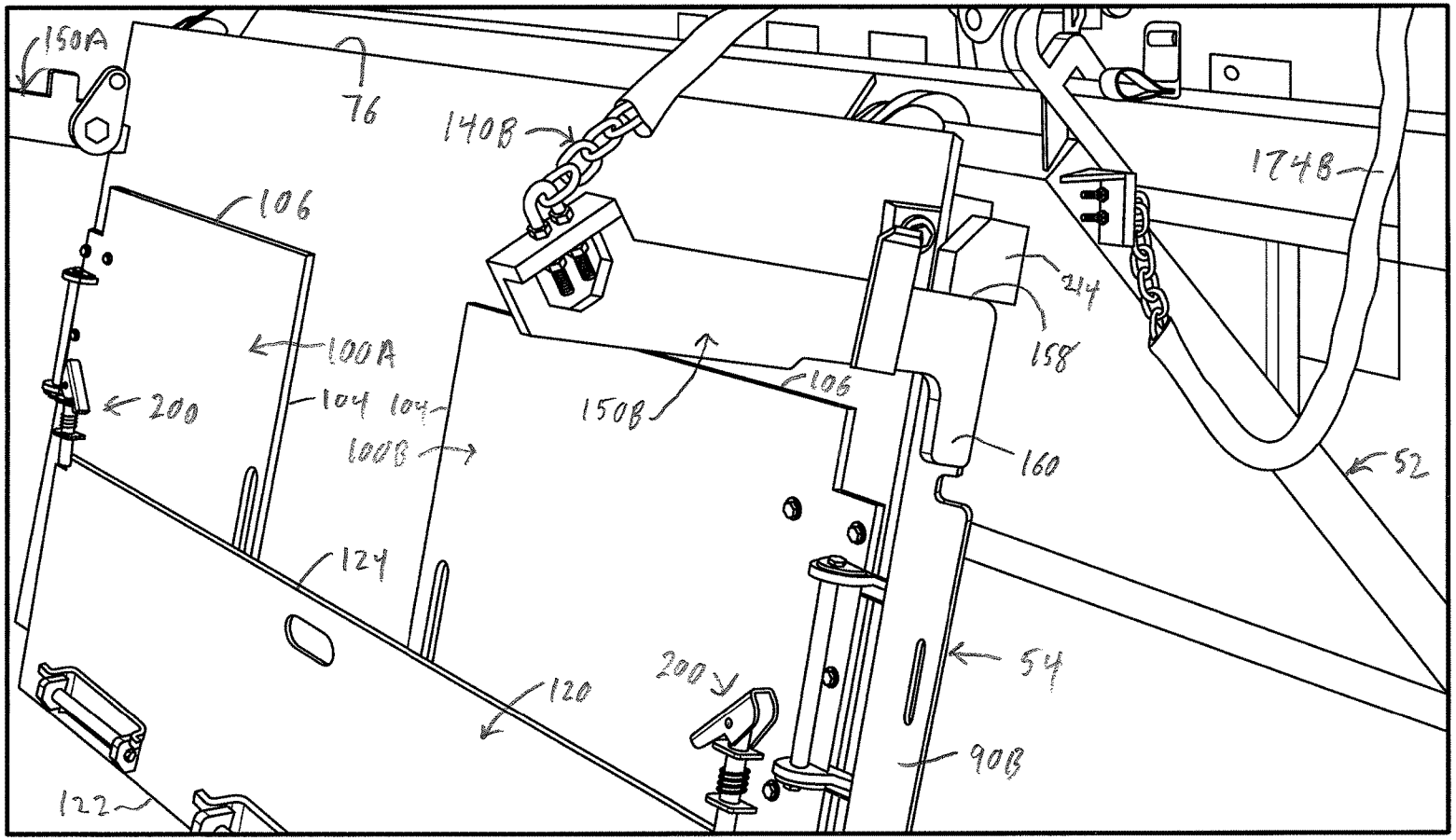
FIG. 6 is a partial perspective view showing the load platform in a partially folded condition wherein the proximal deck section and the distal deck section of the load platform are located between their extended positions and stored positions.

Initially, as proximal deck section 52 and distal deck section 54 pivot from their horizontal extended positions toward their folded vertical retracted positions, restraints 140A and B continue to support distal deck section 54 and inhibit distal deck section 54, as shown in FIG. 6, from pivoting about pivot axis 82 to a generally vertical position until proximal deck section 52 and distal deck section 54 have been sufficiently pivoted and folded about pivot axis 82 whereupon top ends 156 of stanchions 150A and B pivot downwardly about axis 164 with respect to distal deck section 54 from the operational position of stanchions 150A and B toward the stored positions of stanchions 150A and B. The tensile load of tethers 152A and B of restraints 140A and B is then relieved such that tethers 152A and B may collapse. When load platform 50 is in the retracted and stored position, a latch 244 may selectively lock load platform 50 in the retracted position.

Load platform 50 may be moved from the folded and retracted position toward the extended position wherein proximal deck section 52 and distal deck section 54 are generally coplanar and horizontal in substantially the opposite manner as described in connection with the retraction of load platform 50 to the retracted position.

When load platform 50 is in the extended position, each of side ramps 100A, 100B and end ramp 120 may be selectively positioned in their upright retention positions or in their outwardly extending operational positions for the movement of cargo between distal deck section 54 and the loading surface. As shown in FIG. 2, side ramp 100A is pivotally coupled to first side edge 84 of distal deck section 54 and is located between stanchion 150A and distal edge 78 of distal deck section 54. Side ramp 100B is similarly pivotally coupled to second side edge 86 of distal deck section 54 and is located between stanchion 150B and distal edge 78 of distal deck section 54. Unobstructed pathways are thereby provided between side ramp 100A and distal deck section 54 and between side ramp 100B and distal deck section 54. Side ramps 100A and B thereby provide for unobstructed side loading of distal deck section 54 with cargo in a direction transverse to the longitudinal axis of vehicle 22. Restraints 140A and B are respectively located between lifting posts 44A and B and first side edges 106 of side ramps 100A and B such that restraints 140A and B do not interfere with pivotal movement of side ramps 100A and B between their operational and stored positions, and do not interfere with or obstruct the pathways between side ramps 100A and B and distal deck section 54 when side ramps 100A and B are in their operational positions.

Side ramps 100A and B enable unobstructed movement of cargo between side ramps 100A and B and distal deck section 54 and thereby between a loading surface and distal deck section 54. Cargo may be side loaded onto distal deck section 54 by individuals walking across side ramps 100A and B onto distal deck section 54, or by mechanisms such as hand carts or dollies that roll or otherwise move from the loading surface, over side ramps 100A or B and onto distal deck section 54. Cargo may be similarly side unloaded from distal deck section 54 by way of side ramps 100A-B. When load platform 50 is in the extended position and is raised by lift mechanism 36 to the raised position, cargo may be moved between distal deck section 54 and proximal deck section 52 of load platform 50 and cargo floor 24 of vehicle 22.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A liftgate adapted to be attached to a vehicle for use in loading and unloading cargo from the vehicle, the liftgate comprising:

a lift mechanism adapted to [he] *be* coupled to the vehicle;

a load platform having a first deck section and a second deck section, the first deck section being pivotally coupled to the lift mechanism for pivotal movement about a first pivot axis, the second deck section [being] *having a proximal end* pivotally coupled to the first deck section for pivotal movement about a second pivot axis, [the second deck section having] a distal end [a first side edge] *spaced apart from the proximal end*, and a [second] side edge *portion forming a part of a side edge of the platform*, a first restraint having a first end and a second end, the first end of the restraint being coupled to the [first] side edge of the [second deck section] *load platform*, the first deck section and the second deck section being selectively moveable between a retracted position and an extended position, the load platform being selectively moveable between a lowered position of and a raised position;

a first side ramp coupled to the [first] side edge *portion* of the second deck section, the first side ramp being selectively pivotal with respect to the second deck section between an operational position and a stored position wherein the first side ramp overlies the second deck section;

wherein when the first side ramp is in the operational position, cargo can he moved between the first side ramp and the load platform without interference by the

*first* restraint thereby enabling side loading and unloading of the load platform; *and* an end ramp pivotally coupled to the distal end of the second deck section and being selectively pivotal between a stored position wherein the end ramp overlies the second deck section and a use position wherein the end ramp extends outwardly from the second deck section, such that the cargo can be moved between the end ramp and the second deck section when the end ramp is in the use position.

2. The liftgate of claim 1 wherein the first restraint includes a stanchion having a first end pivotally coupled to the second deck section, and a tether having a first end coupled to a second end of the stanchion and a second end coupled to the lift mechanism, the stanchion adapted to engage and support the second deck section when the second deck section is in the extended position while allowing the second deck section to pivot with respect to the first deck section from the extended position to the retracted position of the second deck section.

3. The liftgate of claim 1 including a tether having a first end coupled to the first deck section and a second end coupled to the lift mechanism, the tether adapted to support the first deck section when the first deck section is in the extended position.

4. The liftgate of claim 2 wherein the stanchion includes a foot that extends outwardly from the first end of the stanchion, the foot adapted to releasably engage the second deck section when the second deck section is in the extended position to thereby support the second deck section in the extended position.

5. The liftgate of claim 1 including an actuator coupled to the first deck section, the actuator adapted to selectively pivot the first deck section about the first pivot axis between the extended position and the retracted position of the first deck section, the second deck section adapted to pivot about the second pivot axis with respect to the first deck section as the first deck section pivots about the first pivot axis.

6. The liftgate of claim 5 wherein the actuator comprises a hydraulic cylinder.

7. The liftgate of claim 1 including a second side ramp pivotally coupled to [the second] *another* side edge of the load platform, the second side ramp being selectively pivotal to an operational position wherein the second side ramp extends outwardly from the load platform such that cargo can be moved between the second side ramp and the load platform when the second side ramp is in the operational position.

8. The liftgate of claim 1 including a ramp latch, whereby when the first side ramp is pivoted to overlie the second deck section in the stored position and the end ramp is pivoted to overlie the second deck section in the stored position, the ramp latch is adapted to releasably couple the end ramp to the first side ramp and thereby releasably secure the first side ramp and the end ramp in their stored positions.

9. The liftgate of claim 8 wherein the ramp latch includes a retaining member that is moveable between a retracted position and an extended position, a resilient biasing member adapted to bias the retaining member toward the extended position, and a pivotal lever adapted to move the retaining member to the retracted position and releasably retain the retaining member in the retracted position.

10. The liftgate of claim 1 wherein the lift mechanism includes a latch adapted to releasably retain the first deck section and the second deck section in their retracted positions.

11. The liftgate of claim 1 including a locking mechanism, the locking mechanism including a receiver attached to the first deck section and a coupler pivotally coupled to the second deck section, the receiver including an open-end receptacle, the coupler including a pin adapted to be removably received in the receptacle of the receiver to thereby secure the coupler to the receiver, whereby the locking mechanism is adapted to inhibit pivotal movement of the second deck section with respect to the first deck section about the second pivot axis when the pin of the coupler is located within the receptacle of the receiver, and whereby the pin is selectively removable from the receptacle of the receiver to allow pivotal movement of the second deck section with respect to the first deck section about the second pivot axis.

12. The liftgate of claim 1 including a hinge pivotally coupling the first side ramp to the load platform, the hinge including a link having a first end pivotally coupled to the load platform for pivotal movement of the first side ramp about a third pivot axis and a second end pivotally coupled to the first side ramp for pivotal movement of the first side ramp about a fourth pivot axis.

13. The liftgate of claim 12 wherein the load platform includes a ledge extending outwardly from the load platform and an abutment member associated with the ledge, whereby an end of the first side ramp is selectively positionable in engagement with the ledge and the abutment member of the load platform such that the first side ramp is releasably retained in a generally upright position.

14. The liftgate of claim [1] *7* including a second restraint having a first end and a second end, the first end of the second restraint being coupled to the [second] *other* side edge of the load platform, the second restraint adapted to support the load platform.

15. The liftgate of claim 1 wherein the lift mechanism includes a column adapted to be coupled to the vehicle and a post moveably coupled to the column, the post being selectively moveable between a lowered position and a raised position, the load platform being pivotally coupled to the post.

16. A liftgate adapted to be attached to a vehicle for use in loading and unloading cargo from the vehicle, the liftgate comprising:

a lift mechanism adapted to be coupled to the vehicle;

a load platform having a first deck section and a second deck section, the first deck section being pivotally coupled to the lift mechanism for pivotal movement about a first pivot axis, the second deck section [being] *having a proximal end* pivotally coupled to the first deck section for pivotal movement about a second pivot axis, [the second deck section having] a distal end [a first side edge] *spaced apart from the proximal end*, and a [second] side edge *portion forming a part of a side edge of the platform*, a first restraint having a first end and a second end, the first end of the restraint [and a first side ramp] being coupled to the [first] side edge of the [second deck section] *load platform*, the first deck section and the second deck section being selectively moveable between a retracted position and an extended position the load platform being selectively moveable between a lowered position of the load platform and a raised position of the load platform by the lift mechanism;

*a first side ramp coupled to the side edge portion of the second deck section,* the first side ramp being selectively pivotal with respect to the second deck section wherein when the first side ramp is in an operational position, cargo can be moved between the first side ramp and the load platform without interference by the restraint thereby enabling side loading and unloading of the load platform;

a hinge pivotally coupling the first side ramp to the load platform, the hinge including a link having a first end pivotally coupled to the load platform for pivotal movement of the first side ramp about a third pivot axis and a second end pivotally coupled to the first side ramp for pivotal movement of the first side ramp about a fourth pivot axis; and wherein the load platform includes a ledge extending outwardly from the load platform and an abutment member associated with the ledge, whereby an end of the first side ramp is selectively positionable in engagement with the ledge and the abutment member of the load platform such that the first side ramp is releasably retained in a generally upright position;

a second side ramp pivotally coupled to [a second] *another* side edge of the load platform, the second side ramp being selectively pivotal to a use position wherein the second side ramp extends outwardly from the load platform such that cargo can be moved between the second side ramp and the load platform when the second side ramp is in the use position.

17. A liftgate adapted to be attached to a vehicle for use in loading and unloading cargo from the vehicle, the liftgate comprising:

a lift mechanism adapted to be coupled to the vehicle;

a load platform having a first deck section and a second deck section, the first deck section being pivotally coupled to the lift mechanism for pivotal movement about a first pivot axis, the second deck section [being] *having a proximal end* pivotally coupled to the first deck section for pivotal movement about a second pivot axis, [the second deck section having] a distal end [a first side edge] *spaced apart from the proximal end*, and a [second] side edge *portion forming a part of a side edge of the platform*, a first restraint having a first end and a second end, the first end of the restraint [and a first side ramp] being coupled to the [first] side edge of the [second deck section] *load platform*, the first deck section and the second deck section being selectively moveable between a retracted position and an extended position, the load platform being selectively moveable between a lowered position of the load platform and a raised position of the load platform by the lift mechanism;

*a first side ramp coupled to the side edge portion of the second deck section,* the first side ramp pivotally coupled to the second deck section and being selectively pivotal with respect to the second deck section;

wherein when the first side ramp is in an operational position cargo can be moved between the first side ramp and the load platform without interference by the restraint thereby enabling side loading and unloading of the load platform;

a hinge pivotally coupling the first side ramp to the load platform, the hinge including a link having a first end pivotally coupled to the load platform for pivotal movement of the first side ramp about a third pivot axis and a second end pivotally coupled to the first side ramp for pivotal movement of the first side ramp about a fourth pivot axis; and wherein the load platform includes a ledge extending outwardly from the load platform and an abutment member associated with the ledge, whereby an end of the first side ramp is selectively positionable in engagement with the ledge and the abutment member of the load platform such that the first side ramp is releasably retained in a generally upright position.

*18. A liftgate adapted to be attached to a vehicle for use in loading and unloading cargo from the vehicle, the liftgate comprising:*

*a lift mechanism adapted to be coupled to the vehicle;*

*a load platform having first and second deck sections, the first deck section being pivotally coupled to the lift mechanism for pivotal movement about a first pivot axis, the second deck section having a proximal end pivotally coupled to the first deck section for pivotal movement about a second pivot axis, a distal end spaced apart from the proximal end, and a side edge portion forming a part of a side edge of the load platform;*

*a restraint having a first end and a second end, the first end of the restraint being coupled to the side edge of the load platform, the first deck section and the second deck section being selectively moveable between a retracted position and an extended position, the load platform being selectively moveable between a lowered position of and a raised position;*

*a side ramp coupled to the side edge portion of the second deck section, the side ramp being selectively pivotal with respect to the second deck section between an operational position and a stored position wherein the side ramp overlies the second deck section;*

*a link pivotally coupling the side ramp to the load platform, the link having a first end pivotally coupled to the load platform for pivotal movement of the side ramp about a third pivot axis and a second end pivotally coupled to the side ramp for pivotal movement of the side ramp about a fourth pivot axis;*

*an end ramp pivotally coupled to the distal end of the second deck section and being selectively pivotal between a stored position wherein the end ramp overlies the second deck section and a use position wherein the end ramp extends outwardly from the second deck section, such that the cargo can be moved between the end ramp and the second deck section when the end ramp is in the use position; and*

*wherein when the side ramp is in the operational position, cargo can he moved between the side ramp and the load platform without interference by the restraint thereby enabling side loading and unloading of the load platform.*

* * * * *